United States Patent [19]
Hijiya et al.

[11] 3,871,892
[45] Mar. 18, 1975

[54] SHAPED BODIES OF PULLULAN ESTERS AND THEIR USE

[75] Inventors: Hiromi Hijiya; Makoto Shiosaka, both of Okayama, Japan

[73] Assignee: Hayashibara Biochemical Laboratories, Incorporated, Okayama, Japan

[22] Filed: Dec. 12, 1973

[21] Appl. No.: 424,151

[30] Foreign Application Priority Data
Dec. 18, 1972 Japan.............................. 47-126949
Dec. 22, 1972 Japan.............................. 47-128971

[52] U.S. Cl................. 106/126, 106/213, 260/234
[51] Int. Cl. .......................... C08h 1/00, C08h 7/00
[58] Field of Search ............ 106/126, 213; 260/234

[56] References Cited
UNITED STATES PATENTS
3,784,390  1/1974  Hijiya................................. 106/213

*Primary Examiner*—Theodore Morris
*Attorney, Agent, or Firm*—Hans Berman; Kurt Kelman

[57] ABSTRACT

Pullulan esters are prepared by the reaction of pullulan with aliphatic or aromatic fatty acids or their derivatives in the presence of suitable solvents and/or catalysers. Said pullulan esters can be shaped by compression molding or extrusion at elevated temperature or by evaporation of solvents from their solutions to form shaped bodies, such as films or coatings which are practically impermeable to atmospheric oxygen in thin layers and unaffected by oils and fats so as to provide valuable packaging materials for food, pharmaceuticals, and other oxygen sensitive materials.

6 Claims, No Drawings

SHAPED BODIES OF PULLULAN ESTERS AND THEIR USE

The present invention relates to pullulan esters and particularly to shaped bodies of pullulan esters and their use. Pullulan is a natural polysaccharide consisting of maltotriose units linked by $\alpha$ 1–6 bonds. Pullulan esters are the reaction products of pullulan with aliphatic or aromatic carboxylic acids or their derivatives. Shaped bodies can be obtained by adding if necessary amylose, gelatin and/or their derivatives to pullulan esters, if further necessary, adding water, and/or a hydrophilic organic compound such as acetone or a polyhydric alcohol as plasticizer and by compression molding or extruding the mixture or by evaporation of solvents from their solutions. The shaped bodies of pullulan esters can protect to products which are subject to oxidation, such as foods, drugs, enzymes, coloring and flavoring agents, spices, essences and others, because of the extremely low oxygen-permeability of the pullulan esters in the shaped bodies. These products can be coated, sealed or packaged with a film of pullulan esters to prevent them from direct exposure to environmental conditions.

We previously produced shaped bodies from natural, water-soluble pullulan. However, its water-solubility is so high that it dissolves easily at any mixing ratio.

Pullulan is a linear polysaccharide consisting of maltotriose units linked by $\alpha$-1, 6 bonds. It does not form into micells and is freely water-soluble. Pullulan is produced at high yield by *Pullularia pullulans* IFO 6353, *Dematium pullulans* IFO 4464, etc., in a culture medium containing a carbon source, such as glucose, fructose, maltose, sucrose, invert sugar, date extract, isomerized sugar, or monosaccharide mixtures, e.g. starch syrups, under aerobic conditions. Therefore pullulan is an abundant starting material for the production of pullulan esters, and can be obtained at a moderate price. Its molecular weight ranges from 10,000 to 5,000,000 and can be varied by varying the culture conditions. Although pullulan of any molecular weight is suitable as the starting material for the pullulan esters of the invention, pullulan having a molecular weight of 50,000 to 1,000,000 is most convenient for the preparation of pullulan esters.

Pullulan esters are obtained by the reaction of pullulan with organic acids, their anhydrides and chlorides, or by ester-exchange reaction between pullulan and the esters of the acids in a solvent, e.g. water, pyridine, quinoline, dimethylformamide, dimethylsulfoxide, benzene or xylene, both reactions being carried out in the presence of a catalyst which may be a tertiary organic amine, e.g. pyridine, quinoline and picoline, caustic alkali, fatty acid, sulfuric acid or a sulfonic acid. Pullulan formate having a degree of substitution greater than one is produced by heating gradually and for several hours a mixture of pullulan with an aqueous solution of more than 50% (weight) formic acid. The prolonged heating will cause depolymerization of pullulan. The degree of substitution, D.S., as the term is used throughout the specification, indicates the number of acyl radicals introduced into each glucose unit of pullulan. The highest possible D.S. is 3. The formic acid ester can be separated from the reaction mixture and purified by precipitation with hydrophilic alcohols.

The formyl moieties can be exchanged by reaction of the ester with other fatty acids. Lower fatty acid esters, e.g. acetic acid, propionic acid and butyric acid esters are obtained at higher yields by reacting pullulan with anhydrides of the acids, e.g. acetic-, propionic- and butyric- anhydrides, using pyridine as catalyst. The D.S. of the pullulan ester thus obtained varies from 0.001 to 3.0 according to the ratio of the acid anhydride to pullulan. To avoid depolymerization of pullulan, it is preferable to maintain the reaction temperature within the range from 50° to 100°C. The esters with saturated or unsaturated higher fatty acid such as palmitic- or oleic-acids are produced by reacting pullulan with the acid chlorides in a solvent, e.g. dimethylformamide or benzene, in the presence of a tertiary amine catalyst, e.g. pyridine, picoline and quinoline. It is preferred to dissolve pullulan in dimethylformamide, to add the acid chloride solution dropwise and to perform the reaction for one to 20 hours while keeping the temperature below 100°C. An ester with a D.S. up to 3.0 is obtainable by the reaction. As the product is insoluble in lower alcohols, the product can be precipitated and purified with lower alcohols. As the water-solubility of higher D.S. pullulan esters is low, the products can be washed with water.

The yields were 90–98% of the theoretical ones. In the preparation of esters with moderate or lower D.S., caustic alkali can be used as a catalyst instead of a tertiary amine and benzene as a solvent to adjust the D.S. to a desired level.

Aromatic carboxylic acid esters are prepared by reacting pullulan with ratio of acid chlorides, e.g. benzoyl chloride in pyridine or dimethylformamide. Esters with a D.S. of nearly 3 are obtainable by increasing the acid chloride to pullulan. Although the reaction temperature and time depend on the desired D.S. level, it should be noted that a temperature exceeding 100°C and prolonged reaction time result in depolymerization of pullulan. Mixed esters are prepared by ester exchange from formic acid esters etc. or by simultaneous reaction of pullulan with different anhydrides or acid chlorides.

The introduction of higher fatty acids, e.g. palmitic acid, in to the pullulan affects the solubility. A D.S. of about 0.5 decreases substantially the water solubility, a D.S. of over 1.5 make it extremely difficult to dissolve the palmitic acid esters in water. The same results are observed with benzoic acid esters.

In lower fatty acid esters, e.g. acetic and propionic acid esters, a relatively high water solubility is noted at a D.S. of less than about 1, and at a D.S. of 1.1–1.4 the esters swell with water, but are nearly insoluble in water but souble in water-acetone mixture. Esters with a D.S. above about 1.5 are soluble in organic solvents, e.g. acetone. Esters with a D.S. of 2–3 have greater solubility or swelling property in organic solvents in comparison with esters with lower D.S. The solubility values of lower fatty acid esters in various solvents are given in Table I. The esters are acetone-soluble at a D.S. of about 1.5 and chloroform-soluble at around D.S. 2.0. When the D.S. exceeds about 2.0 they are ethyl acetate-soluble.

Table I

Solubility of lower fatty acid esters of pullulan

| Solvent | Water | | | Acetone | | | Chloroform | | | Ethyl Acetate | | |
|---|---|---|---|---|---|---|---|---|---|---|---|---|
| Test sample | PF | PA | PB | PF | PA | PB | PF | PA | PB | PF | PA | PB |
| D.S. | | | | | | | | | | | | |
| 2.5 | | | | | + | | | + | + | | + | + |
| 2.17 | | | | | + | | | + | + | | ± | + |
| 2.10 | | | | | + | | | ± | | | | |
| 1.97 | | | | | + | | | + | + | | ± | + |
| 1.90 | | | | | + | + | | ± | + | | ± | ± |
| 1.85 | | | | | + | | | | | | | |
| 1.82 | | ± | | | + | | | ± | + | | ± | |
| 1.67 | | ± | | | ± | + | | ± | ± | | ± | |
| 1.52 | ± | ± | | | ± | + | | ± | | | | |
| 1.30 | ± | ± | ± | | ± | | | | | | | |
| 1.20 | + | + | ± | | | | | | | | | |
| 1.1 | + | + | ± | | | | | | | | | |
| 0.8 | + | + | + | | | | | | | | | |

Notes:
The solubility was determined by adding 100mg of each sample to 5ml of solvent with agitation at room temperature. PF, pullulan formic acid ester; PA, pullulan acetic acid ester and PB, pullulan butyric acid ester.
+, dissolves into a transparent solution; ±, swells.

Additionally, the lower fatty acid esters are soluble in formamide, dimethylsulfoxide or dimethylformamide and in any mixtures thereof regardless of their D.S. values.

The equilibrium moisture contents of the lower fatty acid esters vary inversely with the D.S. value. More particularly, the equilibrium moisture content of 10–15%, measured at 30°C and R.H. (relative humidity) 60% declines to less than 3% by elevating the D.S. value of a lower fatty acid ester. The equilibrium moisture contents of pullulan esters are, however, much higher than those of the corresponding fatty acid esters of cellulose or starch with the same D.S. values.

Higher fatty acid ester or aromatic carboxylic acid ester, e.g. pullulan stearic ester or pullulan benzoic ester, which have a D.S. of 2–3 exhibits an equilibrium moisture content of 0.2 to 3.0% at 25°C and R.H. 33–93%, while those of D.S. 0.1–0.5 were 7 to 30% under the same conditions. The equilibrium moisture contents of the esters depend on the D.S. and R.H., however they are 2 to 3 times of those of starch esters, and much higher than the moisture contents of corresponding cellulose esters. The solubilities of pullulan esters with higher fatty- and aromatic carboxylic acids in various solvents are listed in Table II. Those of low D.S., i.e. from 0.1 to 0.5, dissolve or swell considerably in water. Those with a D.S. exceeding 2 do not really dissolve or swell in water or lower alcohols, while those of lower D.S. dissolve in glycerine and swell partially in heated chloroform or benzene. High-D.S. pullulan esters dissolve or swell in ethylether, chloroform, benzene, n-hexane and soybean oil.

Table II

Solubility of higher fatty acid ester and aromatic acid ester of pullulan

| | Starch ester | | Pullulan ester | |
|---|---|---|---|---|
| Solvent | D.S. 0.1–0.5 | 2–3 | D.S. 0.1–0.5 | 2–3 |
| Water | ± | − | ± | − |
| Ethyl alcohol | − | ± | − | ± |
| Ethyl ether | − | ± | − | + |
| Chloroform | ± | + | ± | + |
| Benzene | ± | + | ± | + |
| n-Hexane | − | ± | − | + |
| Ethyleneglycol | ± | ± | − | − |
| Glycerine | ± | ± | + | + |

Notes:
The solubility was determined as described in Table I. +, dissolves; ±, swells; and −, insoluble and does not swell.

Although the pullulan esters are more hydrophilic than corresponding starch esters, they have also higher affinity to organic solvents. This may seem somewhat contradictory and be due to the difference between the chemical structures of starch and pullulan.

Lower fatty acid esters with a D.S. of less than 1 are dehydrated gradually by heating, start to soften and melt at 100°–130°C, and decompose at 235°–245°C. The decomposition temperature of pullulan is 250°–260°C and higher than that of its esters. The softening point of the esters with D.S. 2 is 200°C, and these esters decompose at 210°–220°C, i.e. the softening-melting points and decomposition points decline with increasing D.S. Higher fatty acid and aromatic acid esters with a D.S. of about 2–3 soften gradually at 150°–160°C, and decompose at 170°–180°C, whereas those with a D.S. of less than 1 have higher softening and decomposition points. On direct exposure to the flame of a gas burner, the esters soften, melt or carbonize and then burn down and release only the odor characteristic of scorching carbohydrates. When placed in water, the esters are eventually hydrolyzed by α-amylases, gluco amylases and/or pullulanases of microorganisms. Esters with a D.S. of less than 1 decompose rapidly and those with higher D.S. dissolve and decompose gradually from their surfaces.

When the above characteristics are exploited, shaped bodies of pullulan esters can be produced easily using suitable molding processes. The water solubility of the lower fatty acid esters, e.g. pullulan acetic acid ester, decreases with increasing D.S., but they have still a moisture content of 2–30% and especially the low D.S. esters have a high equilibrium moisture content. They soften and melt upon heating so that fibres, films or sheets can be prepared by extruding said esters from nozzles or slits at 80°–130°C. Since the fluidity of the molten esters decreases due to evaporation of moisture, it is necessary to minimize the variation of moisture content. Fibers and films of superior strength can be prepared by heating the esters in an intensive mixer to prevent excess evaporation, and caution is required during spinning and film formation to hold the evaporation of moisture within desired limits. Capsules can be produced by coating heated rolls or capsule rods with an ester solution containing 30–80% moisture, and then evaporating the moisture. During the molding procedure it is necessary to regulate evaporation to bring the moisture content of the final products to a few percentage points. The fibres and films thus obtained have desirable transparency, do not crystallize nor become brittle, and have desirable durability. In comparison with products of other glucan acetic acid esters the pullulan ester products are more flexible and have satisfactory folding endurance and bending resistance.

Pullulan ester is compatible with other water-soluble, film forming polymers, such as amylose and gelatin, and shaped bodies consisting of mixtures of pullulan ester with such other film-forming ingredients are prepared in the same manner as the pullulan ester bodies, that is, by compression molding or extruding a particulate, intimate mixture of the ingredients, or by evaporation of water from a common aqueous solution. The valuable properties of pullulan ester are retained to an important extent if the mixtures do not contain more than 120% amylose and/or 150% gelatin, based on the weight of the pullulan ester in the mixture.

Although spinning and film formation are possible with acetic acid ester-water systems, plasticizers other than water impart improved properties to the final products. Hydrophilic organic compounds, such as glycerine, ethyleneglycol, propyleneglycol, sorbitol and maltitol, are suitable plasticizers. Products with improved flexibility can be produced by the above melting-mold method with the addition of 1% to 50% of one or several plasticizers to pullulan esters.

Far more favourable results are obtained by adding such plasticizers to pullulan acetic acid ester having a D.S. of more than 1. Since the water solubility of lower fatty acid esters having a D.S. of about 1.0–1.5, is low, the addition of an organic solvent, such as acetone, is necessary. Nearly transparent films are obtained by increasing the amount of acetone with increasing D.S. values of the pullulan esters. When pullulan ester contains not more than 50% plasticizer or organic solvent, the mixture can be extrusion molded under sealed conditions. Solutions with higher plasticizer or solvent contents are warmed, spread or otherwise applied uniformly on a mold or rod and dried to obtain transparent films, sheets, capsules and other shaped bodies. As a pullulan ester having a D.S. of about 1.5 to 1.9 is not very hydrophilic, the ester is dissolved in an organic solvent, e.g. acetone, and then molded. An addition of polyhydric alcohols during the procedure will yield shaped bodies with improved transparency. Since the hydrophilicity varies according to the D.S. value, it is necessary to carry out the molding procedure under conditions suitable for the properties of esters. The plasticizer and solvent should be mixed uniformly with the pullulan ester. If not, the resulting shaped bodies will be in homogeneous, and lack transparency and other desirable physical properties.

Therefore, a pullulan ester powder may be mixed with plasticizer and/or organic solvent, and the mixture sprayed so as to absorb uniformly said plasticizer or solvent on the powder, or the pullulan esters are dried into pellets to which are added appropriate amounts of plasticizer and/or solvent by spraying, and then the sprayed mixtures are allowed to absorb completely and uniformly said plasticizer and/or solvent to assure uniform mixing. The uniform mixture thus prepared is heated gradually at 80°–130°C in an extruder or compressed in a mold at elevated temperature to form the desired shaped bodies. In addition, micro-capsules are also prepared by salting-out of the acetic acid esters. After emulsification of a mixture of an oily substance with a 10–20% aqueous pullulan acetic acid ester solution by vigorous stirring, sodium chloride is added gradually to the emulsion while the temperature of the mixture is kept at 80° to 100°C with continuous stirring. The acetic acid adheres to the drops of the oily substance, and its water solubility of ester decreases so that it is precipitated. An ester encapsulated in the oily product can be obtained by collecting and drying the precipitate. Since the water solubility decreases in esters with D.S. of 2–3, shaped bodies are prepared by adding hydrophilic plasticizers, e.g. polyhydric alcohols or sugar-alcohols, to the esters heating to more than 100°C, melting and molding under pressure. Alternatively, a small amount of hydrophilic organic solvent, e.g. acetone, may be added prior to the heat-molding whereby the solvent is removed from the shaped bodies.

As is apparent from the above description, films and fibres prepared from an ester of a D.S. smaller than 1 and plasticizer are soluble in cold water, and possess a desirable transparency and other physical properties, as well as superior strength. The tensile strength of the pullulan ester films ranges from 5 to 10 kg/mm$^2$, depending on the kind of pullulan used, and the strength is sufficient for packaging materials.

Even very thin films of pullulan esters are almost impermeable to atmospheric oxygen. The films of pullulan esters are valuable packaging materials for materials that need to be protected against atmospheric oxygen. Oxygen permeability of films are illustrated in Table III.

Table III

| Sample | Oxygen permeability of various films | |
| --- | --- | --- |
| | Plasticizer | Oxygen permeability, ml/m$^2$/day atom |
| Amylose | Water 10% | 2.1 |
| Pullulan | Water 15% | 1.8 |
| Pullulan acetic acid ester film, D.S. 0.8 | Water 12% | 1.5 |
| Pullulan acetic acid ester, D.S. 1.5 | Water 5% Ethylene glycol 5% | 2.0 |
| Pullulan acetic acid ester, D.S. 2.5 | Glycerine + Maltitol 10% | 1.8 |
| Pullulan acetic acid ester, D.S. 0.8 Hydroxy ethyl pullulan, D.S. 0.1 (2:1) | Water 13% | 2.2 |
| Cellophane | | 4.7 |

The pullulan ester films are heat readily sealed in a vacuum. As in inherent in the above properties, the esters are suitable for packing, packaging or encapsulating commercial enzymes, convenience foods, powdered drinks, confectioneries, especially for drugs, vitamins, coloring and flavoring agents, spices and foods which are unstable in the presence of atmospheric oxygen without affecting the taste or flavour of the packed materials. The packaging materials dissolve in saliva or cooking water so that the packed materials are instaneously effective. The materials of this invention are more suitable for convenience foods than conventional packaging materials since the pullulan esters impart viscosity to foods and drinks when they are dissolved in water.

Since the pullulan ester solutions have high adhesiveness, films free from pin holes can be applied on foods, tablets, pharmaceuticals by direct spraying of an ester solution on the materials or immersing them in the solution and then drying the film with warm air.

Details of the application of films prepared from fatty acid esters with having a smaller D.S. than 1, will be illustrated by specific Examples. Convenience foods and drinks, e.g. instant noodles and their subsidiary ingredients; powdered products in which flavor is important, e.g. seasonings, spices, coffee, curry and soups; products sensitive to atmospheric oxygen. e.g. enzymes and pharmaceuticals; protease, lipases and amylases which are ingredients of digestants and detergents; vitamins and dry yeast are representative examples of the products to be packaged or sealed in pullulan esters. Additionally, foods, confectioneries and pharmaceuticals in tablet form can be packed conveniently by placing the tablets in rows between two sheets of the films which are then heat-sealed to materials which readily deteriorate or scatter, e.g. dried or dehydrated vegetables, can be placed on pullulan ester films and sprayed with ester solution to fix them on the films. The ester solutions can also be used for wet products, e.g. frozen meat, poultry, fish. Fresh meat is sprayed with or immersed in a 5–20% aqueous ester solution to coat it with a pullulan ester film whereby the rancidity or putrefaction of the meat due to oxidation can be eliminated. The pullulan ester films are superior to those prepared from amylose because they are stable, do not cause retrogradation nor turbidity at low temperature, and are removed freely when the coated materials are defrosted. Moreover, since the pullulan esters are oil-resistant, they are suitable for oily foods, e.g. doughnuts, tempura, fries, butter and cheese. Oily pharmaceuticals, e.g. fat-soluble vitamins and other oily substances, can be injected between layers of soft pullulan ester films containing polyhydric alcohol and water, and then the layers are heat sealed to form spherical capsules. Pharmaceuticals are tabletted on a tabletting machine at elevated temperature after mixing with powdered pullulan ester. The contents of the tablets are stabilized by the melted pullulan ester film which covers the surface of the tablets.

Pullulan esters with a D.S. of about 1 to 2 make films and capsules of relatively low water solubility. The shaped bodies hardly exhibit oxygen permeability, swell in water, dissolve gradually in water, and are especially suitable for the preparation of capsules for slow acting pharmaceuticals or for packaging foods and drinks which require boiling. Fibres or sponges prepared with the esters are suitable for the preparation of dressings used for local treatments after being immersed in medicinal agents. Upon disposal, the shaped articles absorb water, dissolve gradually, and are biodegraded to minimize environmental pollution. Esters having a D.S. of more than about 2, hardly exhibit oxygen permeability, do not swell by absorption of water, and are suitable as a starting material for preparing glossy, transparent films, fibres, sheets, dishes, plates, cups, and other containers for foods, drinks and pharmaceuticals. Thus the esters can be used in the manner of conventional plastics.

Although the pullulan esters may be used in mixtures with gelatin, amylose, starch, or their derivatives, it is preferable to restrict these additives to not more than 50% since an excess will lower the transparency and impart brittleness to the final products.

The invention will be further illustrated by the following examples.

EXAMPLE 1-a

Preparation of lower fatty acid esters of pullulan 50g dehydrated pullulan having a molecular weight of 320,000 and 100g pyridine were dissolved in 500g dimethylformamide. To the solution, was added with agitation 30g acetic anhydride at 65°C over a period of 1 hour, and the mixture was cooled after a further hour of reaction. Methanol was added to precipitate the pullulan esters formed. After repeated filtration, dissolution in water, and re-precipitation the esters were washed with methyl alcohol and dried. The yield was 65g and the D.S. of the pullulan ester was 0.6. Under otherwise similar conditions, a product with a D.S. of 1.01 was obtained by using 50g acetic anhydride, and a product of D.S. 1.3 was obtained by extending the reaction period for an additional 3 hours. Propionic- and butyric acid esters were obtained with equivalent amounts of the respective anhydrides under identical conditions, and the products had similar D.S. values. Products of different D.S. were obtained by adjusting the reaction temperature and period.

EXAMPLE 1-b

The properties of pullulan fatty acid esters and preparation of films therefrom

The relationships of the softening point, water-solubility and equilibrium moisture content at 30°C and RH (relative humidity) 60% are listed in Table IV.

The esters were shaped into films by extruding them. The temperature at the discharge end of the extruder was maintained higher than the softening point of the esters, e.g. from 100° to 140°C. Although the films are, generally, slightly hard and brittle, they are usable. An increase in the D.S. hardens the films and increases their brittleness. Films can be produced from palmitic and lauric acid esters, but the films are slightly brittle under dry conditions, although they are transparent.

Table IV

| Pullulan ester | D.S. | Properties of pullulan esters | | Solubility | | |
| --- | --- | --- | --- | --- | --- | --- |
| | | Equilibrium moisture content(%) | Softening point (°C) | Water | Acetone+ Water (1:1) | Acetone |
| Acetic ester | 0.50 | 15 | 120 | + | ± | − |
| | 1.10 | 10 | 125 | + | ± | − |
| | 1.15 | 5 | 100 | ± | + | − |
| | 1.35 | 5 | 100 | − | + | ± |
| | 1.40 | 3 | 100 | − | + | ± |
| | 1.50 | 3 | 95 | − | ± | + |
| Formic ester | 0.5 | 15 | 120 | + | ± | − |
| | 1.3 | 10 | 100 | ± | + | ± |
| | 1.5 | 5 | 100 | − | + | ± |
| | 1.7 | 2 | 100 | − | ± | + |
| Palmitic ester | 1.5 | 1.5 | 130 | − | ± | + |
| Lauric ester | 1.3 | 1.3 | 100 | − | ± | + |

Notes:
Equilibrium moisture contents were measured at 30°C and R. H. 60%. Solubilities of the pullulan esters were measured at 20°C with 100 volumes of solvents.
+, dissolves; ±, swells; and −, insoluble:
The molecular weight of the pullulan was 150,000.

EXAMPLE 1-c

Preparation of pullulan acetic acid ester films

In this example, pullulan having a molecular weight of 500,000 was used. The kinds and amounts of plasticizers, the equilibrium moisture contents (both based on pullulan acetic acid ester) and water solubilities of the films are listed in Table V. The pullulan acetic acid ester powder, plasticizer and water were mixed uniformly, and the mixture was kneaded and extruded into film while the temperature at the discharge end of the extruder was held at 100°C to 120°C. The use of propylene glycol above as a plasticizer resulted in a more flexible and elastic film. When maltitol was partly substituted for the propylene glycol, the film was slightly harder, but films 0.05mm thick showed both desirable transparency and elasticity.

Table V

Water solubility of pullulan acetic acid ester films

| Sample | D.S. | Plasticizer (%) | Moisture content (%) | Water solubility (film) |
|---|---|---|---|---|
| 1 | 0.2 | 5 | 15 | + |
| 2 | 0.8 | propylene 5 | 10 | + |
| 3 | 1.2 | glycol 15 | 5 | ± |
| 4 | 1.5 | 15 | 3 | ± |
| 5 | 0.2 | 10 | 15 | + |
| 6 | 0.8 | propylene 10 | 10 | + |
| 7 | 1.2 | glycol +10 | 5 | ± |
| 8 | 1.5 | maltitol (1:1) 10 | 2 | ± |

Note:
The conditions for the water solubility tests and the results are expressed in the same way as in Table IV.

EXAMPLE 1-d

Preparation of pullulan butyric acid ester films

Pullulan butyric acid ester (D.S.0.5) was mixed with 5% of glycerol and six volumes of water based on the ester, the mixture was dissolved at 70°C with agitation, and then the solution was spread on a clean metal plate. Films, 0.1mm thick, were obtained after drying with hot air. The films were transparent, elastic, stable at R.H. of 50%–60%, and non-hygroscopic and were suitable for packing and wrapping food products. The same solution is suitable for coating the food products by spraying. The coating adheres readily on the products and the film can be dried in hot air. It is removed easily by immersing it in hot water or by washing it with water.

EXAMPLE 1-e

Preparation of pullulan acetic acid ester fibres.

A mixture, prepared by spraying a mixture of 300g propylene glycol and 330g water on 1kg of a dehydrated pullulan acetic acid ester powder, molecular weight 250,000, D.S.0.3, with agitation, was allowed stand for an hour and then kneaded in an extruding type test spinning machine, keeping the temperature at the entrance of the machine at 50°C and the extrusion of nozzle at 100°C. The fibre extruded from the nozzle with a diameter of 1.5mm was wound up at 3 times the extrusion rate in hot air at 80°C. The fibre exhibited desirable elascity and flexibility.

EXAMPLE 1-f

Preparation of pullulan propionic acid ester fibres

A fibre was prepared from pullulan propionic acid ester (D.S.0.35) with an extruder at 130°C as in Example 1-e, propylene glycol being used as plasticizer. The fibre was elastic and transparent, and dissolved readily in hot water, but was difficult to dissolve in water, fats and oils at room temperatures. However, the fibres were suitable for the production of guazes which were easily removed by washing with hot water.

EXAMPLE 1-g

Preparation of mixed pullulan ester

According to the method described in Example 1-a, pullulan acetic acid ester with a D.S. of 0.3 was prepared, and further substituted with a butyryl radical to a D.S. of 0.2 using butyric anhydride. Plates and sheets were obtained from the mixed ester product by compression at 100°–130°C at with a moisture content of 10%. The plates and sheets were water-soluble and moisture-resistant at room temperatures, were not sticky and suitable for producing disposable containers and the like.

EXAMPLE 1-h

Preparation of films from a mixture of pullulan acetic acid ester and amylose Pullulan acetic acid ester, D.S. 0.7 molecular weight 250,000, was mixed with five parts by volume water and one half its amount of amylose (obtained by gelatinizing a corn-starch suspension and then hydrolyzing the amylopectin present by means of a debranching enzyme). The mixture was dissolved by heating. After being mixed uniformly with 5% of propylene glycol, the resulting product was applied to clean metal plates and thereafter dried with warm air at 80°C, to obtain transparent films of uniform quality. The films possessed high tensile strength, were resistant to aging as well as water-soluble, and suitable for preparing especially for capsules.

EXAMPLE 1-i

Preparation of pullulan acetic acid ester films

To an aqueous 15% pullulan acetic acid ester solution, D.S. 0.5, prepared to pullulan having a molecular weight of 200,000, was added a maltitol-propylene glycol-polyvinylalcohol plasticizer (1:-1:1) in an amount of 30% based on anhydrous pullulan ester and gelatin in an amount of 5% based on said anhydrous ester, the mixture was kneaded at 90°C and spread on a clean metal plate maintained at 70°C. The films were cooled to room temperature and stripped from the plates. They were transparent, glossy and elastic. Gas permeation tests revealed that the films are hardly oxygen permeable. Although the films dissolve easily in cold water, they are hardly hygroscopic, nor do they release

EXAMPLE 1-j

Preparation of pullulan butyric acid ester films

Satisfacorily elastic and transparent films were obtained with pullulan butyric acid ester, D.S. 0.6, as in Example 1-i. The films were highly water-soluble and extremely little hygroscopic under atmospheric conditions.

EXAMPLE 1-k

Pullulan butyric acid ester coatings

An aqueous 20% pullulan butyric acid ester solution obtained as in Example 1-j was applied as a coating on the surfaces of confectioneries by spraying, and the coating was dried immediately with warm air. It was glossy and transparent. It prevented deformation and prolonged the storage- and shelf-lives of the products.

EXAMPLE 1-l

Preparation of pullulan acetic acid ester plates and sheets 500g of pullulan acetic acid ester pellets, D.S. 1.2, obtained by acetylating pullulan, molecular weight 100,000, with acetic anhydride, were sprayed with 50g water and, thereafter, with 50g ethylene glycol, and then allowed to stand for a period sufficient for uniform absorption of the water and ethylene glycol into the pellets. The resulting product was fed to a hot press wherein the mixture was shaped into plates at 120°–130°C and cooled at 30°C. The plates were transparent, resistant to humidity, contained no air bubbles, and swelled gradually and deformed finally in boiling water. Films prepared with a 30% aqueous solution of the mixture were heat-sealable at about 100°C.

EXAMPLE 1-m

Preparation of pullulan acetic acid ester films

Soft films were obtained by adding 100g propylene glycol and 100g water to 500g of the ester described in Example 1-l, allowing absorption, kneading at a temperature over 100°C, and casting the resulting product on clean metal plates. The films so produced exhibited high elongation ratio, satisfactory flexibility and other properties comparable to the films of the preceding example. Oily vitamin A was injected between two sheets of the films, 0.2–0.1mm thick, and was encapsulated in spherical soft capsules by heat-sealing the films.

EXAMPLE 1-n

Preparation of pullulan acetic acid ester capsules

Pullulan acetic acid ester, molecular weight 50,000, D.S.1.4, was mixed with 10% water, 10% acetone and 10% of an ethylene glycolmaltitol (1:1) plasticizer, and the mixture was kneaded at 100°C, applied to round glass-rods dried at 70°C and cooled. The capsules thus obtained were elastic, hardly deformable, but swelled and readily broken in warm water. It is apparent from their properties that these capsules are suitable for medicinal uses.

EXAMPLE 1-o

Preparation of pullulan acetic acid ester and films thereof

A pullulan having a molecular weight of 200,000 was added to a 10 fold amount of dehydrated pyridine, and acetic anhydride was added thereto in an amount of 5 moles per glucosidic unit of the pullulan, the mixture was allowed to react at 70°C for 10 hours and then kept at 100°C for 30 minutes. The product was freed from pyridine under reduced pressure and then washed with methanol. An additional washing and purification with water gave a white powder product of D.S. 2.8 at a yield of 91% of the theoretical. To the ester powder were added 5% water, 10% maltitol and a 10 fold amount of acetone. After heating at 70°C with agitation, films were prepared and dried. The films were non-hygroscopic at R.H. 50–70%, and moisture resistant. The tensile strength and folding endurance of the films were superior to those prepared with other corresponding polysaccharide esters.

EXAMPLE 1-p

Preparation of pullulan palmitic acid ester 100g of pullulan, molecular weight 300,000, was dissolved in 500g dimethylformamide, and the mixture was held at 50°C for 10 hours with dropwise addition of 800g palmitic chloride and agitation. After removal of the solvent by distillation under reduced pressure, the reaction product was washed repeatedly with an aqueous alkaline solution, and an ester having a D.S. of 2.3 was obtained in an amount of about 300g. A mixture obtained by dissolving 100g of the product and 10g ethylene glycol in 500ml of benzene was heated to 70°C. Films were prepared by applying the solution to clean metal plates and drying. The transparent, flexible films thus obtained possessed a high moisture resistance and were found suitable as a packaging material for general use. The form or shape of the film could not be recognized after burial in the ground for 7 months.

EXAMPLE 1-q

Preparation of pullulan benzoic acid ester 100g pullulan was dissolved in dimethylformamide, and 300g benzoyl chloride was added to the solution over a period of 1 hour at 75°C. The mixture was allowed to react for 5 hours with agitation. After completion of the reaction, the solvent was removed by distillation under reduced pressure, and the acid was washed off with an aqueous alkaline solution. Purification with ethyl alcohol gave the desired product, pullulan benzoic acid ester, having a D.S. of 2.5. The ester was mixed with 5% ethylene glycol in chloroform, and films were obtained by drying the mixture on metal plates at 60°C. The films were satisfactorily transparent, elastic, and showed beautiful gloss.

EXAMPLE 1-r

Natural degradation tests

Degradation tests were carried out with cold-water-insoluble pullulan acetic acid esters of preceding examples. In the tests, three sheets of each type were placed outdoors 20cm under the ground and their loss of shape was observed at half-month intervals. The results are listed in Table VI.

Table VI

Natural degradation test

| Sample | Example | D.S. | Plate thickness (mm) | Original shape or form retention period (month) |
|---|---|---|---|---|
| 1 | 1-l | 1.2 | 5 | 1.5 |
| 2 | 1-m | 1.2 | 0.5 | 1.0 |
| 3 | 1-n | 1.4 | 0.1 | 2.0 |
| 4 | 1-o | 2.8 | 0.15 | 5.0 |

Whereas Sample No. 3 degraded to a state that its form or shape was almost not recognizable after two months, Sample No. 4 lost most of its shape after five months.

EXAMPLE 1-s

Combustion test

When the samples of Examples 1-a to 1-h were exposed to the flame of a gas burner, they burned down with small flames with gradual carbonization. During the combustion no foreign or irritating odor and gas was formed. Moreover carbon monoxide was hardly detected in the collected gas.

EXAMPLE 2-a

Protection of fats and oils against oxidation

Sardine oil consisting of glycerides of unsaturated fatty acids, the flavor of which readily deteriorates by oxidation, oleic acid, and linoleic acid were absorbed separately on diatomaceous earth in order to enlarge the surface exposed to the atmosphere. 10g portions of the substances were wrapped in films 0.05mm thick, prepared from pullulan, pullulan acetic ester (D.S.1.1) and cellophane, and heat-sealed in a vacuum. They were allowed stand at 20°C together with unprotected controls and the aldehyde formed by autoxidation was determined by measuring light absorbances in the TBA method [C. G. Sidwell et al., Journal of the American Oil Chemists' Society, Vol. 31, 603–606 (1954)].

As is apparent from the results listed in Table VII, films of pullulan acetic ester acid are effective in protecting fats and oils against oxidation. Measurement of peroxide formation in accordance with the method of B. N. Rockwood et al, Analytical Chemistry, Vol. 19, 853 (1947), ranks the films superior to cellophane films.

EXAMPLE 2-b

Storage of dry yeast and detergent 5g portions of baker's yeast and the same amount of detergent containing alkaline protease were packed and sealed separately in pullulan acetate films, D.S.0.7, and pullulan films, 0.05mm thick respectively, under vacuum conditions, and five samples of each product were stored at 30°C and R.H. 50%. After storage for 1 month and a half the activities of the protease and yeast were determined. The fermentative activity of yeast was measured by the $CO_2$ formation on a medium containing 3% sucrose.

Table VIII

Residual activity of enzymes packed in pullulan acetic acid ester films.

|  | Pullulan acetic ester film | Pullulan film | No-packaging |
|---|---|---|---|
| Enzymatic activity | 87% | 84% | 30% |
| Protease activity | 61% | 80% | 28% |

As the results listed in Table VIII show, products packed in pullulan acetic ester films maintain their protease or yeast activities at a higher level than unprotected products.

EXAMPLE 2-c

Storage of vitamins

One gram portions of L-ascorbic acid and of riboflavine were packed and heat-sealed in films of pullulan acetic acid ester, D.S. 1.0, or polyethylene under vacuum conditions, and then 10 packets of each were packed in polyethylene bags. After storage in a room constantly maintained at 30°C for 6 months, the residual vitamins were determined, the results being listed in Table IX.

Table VII

Protection of oil against oxidation by pullulan acetic acid ester films.

| Storage time | 0 days | | | | 14 days | | | |
|---|---|---|---|---|---|---|---|---|
| Packaging agent | | | No-packaging | | Pullulan | | Pullulan acetic acid | |
| Absorbance mμ | 530 | 450 | 530 | 450 | 530 | 450 | 530 | 450 |
| Oleic acid | 0.020 | 0.002 | 0.070 | 0.025 | 0.045 | 0.032 | 0.051 | 0.030 |
| Linoleic acid | 0.025 | 0.009 | 0.200 | 0.913 | 0.077 | 0.015 | 0.057 | 0.020 |
| Sardine oil | 0.035 | 0.003 | 1.905 | 0.514 | 0.067 | 0.041 | 0.060 | 0.052 |

| Storage time | 14 days | |
|---|---|---|
| Packaging agent | Cellophane | |
| Absorbance mμ | 530 | 450 |
| Oleic acid | 0.055 | 0.028 |
| Linoleic acid | 0.105 | 0.038 |
| Sardine oil | 0.180 | 0.210 |

Note:
TBA values are the absorbances of 0.1g of fat and oil at 530 mμ and 450 mμ

Table IX

Residual amounts of vitamins packed in pullulan acetic ester films.

| Vitamin | Pullulan acetic acid ester film | Polyethylene film |
|---|---|---|
| L-ascorbic acid | 93% | 25% |
| Riboflavine | 95% | 30% |

EXAMPLE 2-d

Instant foods

Powdered soup, curry, cocoa, coffee and subsidiary ingredients for instant noodles (e.g. dehydrated vegetable, shrimps, pork, sesame, etc.) were packed and heat-sealed in films of pullulan acetic acid ester, D.S.1.3, containing 5% glycerine as plasticizer, 0.06mm thick, and then stored in a room kept constantly at 25°C and R.H. 50% together with cellophane-packed controls. After storage the contents of the packets were cooked and tested. Those packed in pullulan acetic acid ester film were cooked in hot water with the film intact. The packets swelled, degraded and lost its original form within 10 seconds. Fifteen of the twenty male panel members who performed sensory tests on the soup and coffee rated the products packed in pullulan acetic:acid ester film distinctly superior to the unprotected products in flavour and taste.

EXAMPLE 2-e

Preservation of Food Products Containing Edible Fats a. Packaging of Butter and Cheese Dairy products, such as butter and cheese, were wrapped in a film of mixed pullulan acetic-propionic acid ester (D.S.0.8), 0.5mm thick, the wrapped products were further enclosed in a pullulan acetic acid ester film of D.S.2.8 containing 5% propylene glycol. These samples were stored in a refrigerator at 5°C together with aluminum-foil-wrapped commercial products for 2 months, and the effects of aluminum foil and pullulan ester films were compared. As a result, it was noted that the latter were superior to the aluminum foils in that the contents were visible through the transparent films and the internal film was edible without removal and gave neither foreign odor not unpleasant feeling to the mouth. Besides, the products maintained their fresh flavor and hardly lost moisture from the surface.

b. Packaging of Doughnuts

Immediately after preparation, 10 doughnuts were spraycoated with a warm 20% pullulan acetic acid ester solution, D.S.1.1, and the same number of fresh doughnuts were packed and heat-sealed in a film of identical composition. These samples were stored in a constant temperature room at 25°C, R.H. 50% for 3 weeks together with 10 bare controls, and subjected to organoleptic test. Samples either coated with or packed in the pullulan esters maintained their original luster, hardly showed a decrease in weight, showed little exudation of fats, and had no foreign odor due to rancidity of fats. The controls suffered a decrease in weight, becoming harder and brittle in texture, having a racid odor and showing a general deterioration in quality.

c. Preservation of Fried Confectionery

Generally, fried confectioneries containing large amount of edible fats such as "Karinto" (fried cookies coated with sugar), "Okonomiage" (fried dough-crackers), butter-roasted peanuts, etc. tend to rancidity, thus losing the fresh flavor of the products. Fresh fried or roasted products were packed in film having a thickness of 0.7mm, consisting of pullulan acetic acid ester, D.S. 2.9 and 5% propylene glycol, and stored in a room at 25°C, R.H. 60% together with controls packaged in polyethylene. After 30 and 60 days, organoleptic tests were performed. The samples packed in pullulan acetic acid ester showed only a little difference in odor after 30 days but they were apparently superior in flavor and taste to the controls after 60 days.

EXAMPLE 2-f

Coating of Frozen Food

Fresh mackerels were spray-coated completely with an aqueous solution of 3% pullulan acetic acid ester, D.S.1.0, and immediately stored at −20°C together with non-coated controls. Both were thawed after 2 month storage and compared. The pullulan ester films were easily removable with water and the mackerels coated with the film were superior to the controls in maintaining their original fresh appearance. Besides, the peroxide value in the non-coated fish meat under the epidermis showed an increase.

EXAMPLE 2-g

Preservation of chicken or poultry

A coating solution was prepared by mixing pullulan acetic acid ester, D.S. 0.9, with 6% of ethylene glycol and 20 volumes of water. Portions of meat cut from plucked chicken were sprayed thoroughly with the solution, vacuum dried at more than 60°C to reduce the water content of the film to 10–15%, and stored at −20°C. Also non-coated portions of chicken prepared similarly were stored under the same conditions. In the coated product stored for 2 months, excess drying of the meat was prevented, the coatings retained their transparency, flexibility, adhered satisfactorily to the meat, and no crack nor other defect was noted. Moreover the fresh meat-colour was fully observed through the films. Although the coating is easily removed by washing with hot water, the chicken may be cooked as is. The coated chicken retain their fresh flavour, taste, and organoleptic tests showed that the coated products are distinctly superior to the non-coated controls in fresh flavour or taste. In addition, the films protect oil and fat against oxidation, as evidenced by the peroxide values of the meat extracts, the values of which were less than one fourth of those of the controls.

EXAMPLE 2-h

Preservation of ham

Non-wrapped ham, i.e. ham prepared by drying and smoking the tied metal, and ham coated with a 0.02mm thick film by spraying uniformly with a 5% pullulan acetic acid ester solution, D.S.1.0, were tested. The films dried in an air stream at 70°C were transparent, flexible and tenacious. The uncoated and coated hams were stored at 5°C for 6 months. The coating showed no crack nor cloud in appearance, and the contents showed no deterioration in taste in organoleptic tests after opening of the envelope. The aldehyde formation of the coated product was less than one fourth of the control.

EXAMPLE 2-i

Protection of lyophilized (freeze-dried) foods against oxidation

Spinach was sliced, sprayed with a 15% pullulan propionic acid ester solution (D.S.0.5) and then freeze-dried. Comparison tests over 5 months could hardly prove a difference among the samples in color and form. The products retained their fresh colour and flavour even after cooking.

EXAMPLE 2-j

Packaging of instant Chinese noodles

A dough prepared by kneading flour, table salt, colouring agents and water was rolled and sliced into noodles which were precooked with steaming, thereby converting the flour into α-type starch. After dividing the noodles into portions of one serving, the noodles were fried in oil at 130°–140°C and dehydrated. A mixture of equal amounts of pullulan acetic acid ester and pullulan propionic acid ester, both D.S.1.4, was mixed with 10% of maltitol based on the pullulan esters, and the resulting mixture was converted into a 20% aqueous solution from which there were prepared films, 0.1mm thick, by rolling and drying. The instant noodle product was packaged in bags prepared from the films or sprayed with the pullulan ester solution and dried immediately at 80°C. Separately, the subsidiary ingredients, i.e. dried (dehydrated) meat, mushroom ("Shiitake"), dried (dehydrated) vegetables and powdered soy sauce, were arranged in a row to form a thin layer on the above pullulan ester film, then the ingredients were sprayed with the same pullulan ester solution and dried immediately at 70°C. One serving of the packed ingredients and noodles were packed together in a moisture-proof cellophane bag. Five packages of the resulting product were stored over a period of 1 to 6 months together with five bags of controls, i.e. non-coated or non-packed noodles and ingredients, and were subjected to organoleptic tests after cooking. In addition, the peroxide-values and aldehyde-values of the products were measured. Each of the ester coated or packed products showed fresh flavour, and no deterioration was detected in flavour and taste. The products which were only packed in moisture-proof cellophane showed a deterioration in taste and flavour within only 2 months of storage. The pullulan ester coating or films used for packaging the materials dissolved in hot water at 90°–100°C in 2 to 3 minutes.

What is claimed is:

1. A shaped solid body essentially consisting of a pullulan ester of a fatty acid having up to 18 carbon atoms or benzoic acid, or of a mixture of said ester with at least one member of the group consisting of up to 120% amylose and up to 150% gelatin, said percent being by weight of said pullulan ester, the pullulan in said ester having a molecular weight of 10,000 to 5,000,000.

2. A body as set forth in claim 1, further containing a plasticizer selected from the group consisting of water, acetone, glycerin, ethyleneglycol, propyleneglycol, polyvinylalcohol, sorbitol, or maltitol in an amount of 1% to 50% based on the weight of said ester.

3. A body as set forth in claim 1, wherein the pullulan in said ester has a molecular weight of 50,000 to 1,000,000, at least one thousandth of the available hydroxyl groups in said pullulan being substituted by acyl radicals of said fatty acid or said benzoic acid acid.

4. A method of making a shaped body as claimed in claim 3 which comprises mixing said pullulan ester with said amylose, said gelatin and a volatile solvent, imparting a shape to the solution so produced and substantially removing the solvent from the shaped solution.

5. A method making a shaped body as claimed in claim 3 which comprises shaping said mixture above the softening temperature thereof under applied pressure.

6. A body as set forth in claim 1, wherein at least one of the three hydroxyl groups available in each glucose unit of said pullulan is substituted by said acyl radicals.

* * * * *